Sept. 9, 1969 E. H. SCHMIDT 3,466,619

COUNTING CIRCUIT UTILIZING A QUANTIZED MAGNETIC CORE

Filed Dec. 13, 1963

INVENTOR
EDWIN H. SCHMIDT
BY Omund R. Dahle
ATTORNEY

United States Patent Office 3,466,619
Patented Sept. 9, 1969

3,466,619
COUNTING CIRCUIT UTILIZING A QUANTIZED MAGNETIC CORE

Edwin H. Schmidt, Minnetonka, Minn., assignor to Honeywell Inc., a corporation of Delaware

Filed Dec. 13, 1963, Ser. No. 330,476
Int. Cl. G11b *5/62*
U.S. Cl. 340—174 15 Claims

ABSTRACT OF THE DISCLOSURE

A magnetic counter system which includes magnetic cores and transistor devices for providing an accurate temperature compensated count. An active transfer circuit is provided which gives optimum temperature compensation without the necessity of using additional temperature responsive elements and which further amplifies the signal transferred from one core to another.

This invention is concerned with magnetic integrating apparatus and more particularly with an improved magnetic counter system which includes magnetic cores and transistor devices for providing an accurate, temperature compensated count of a variety of input signals.

The use in a counter system of a binary magnetic core and a count or quantizing magnetic core is fast becoming well known in the art. Such systems often utilize a set and reset channel associated with each core, and have a passive transfer circuit between the cores. One of the major disadvantages of such systems is their tendency to be subject to count variations due to temperature changes. This invention is novel in the use of an active transfer circuit which enables the use of an optimum temperature compensation design without the use of additional temperature responsive elements. Such systems also often use either a current sensitive or voltage sensitive reset channel associated with the count core. This may lead to an excess use of power and may also cause a shift in time of the output pulse with respect to the final input pulse. This invention combines both current and voltage sensing in the reset channel to overcome these difficulties.

It is therefore an object of this invention to provide an improved magnetic counter system.

A further object of this invention is to provide a magnetic counter system having at least two magnetic cores with an active transfer circuit between cores.

A further object of this invention is to provide a magnetic counter system with means for improving the count stability relative to changes in temperature.

A still further object of this invention is to provide a magnetic counter system with an improved reset channel.

Figure 1:
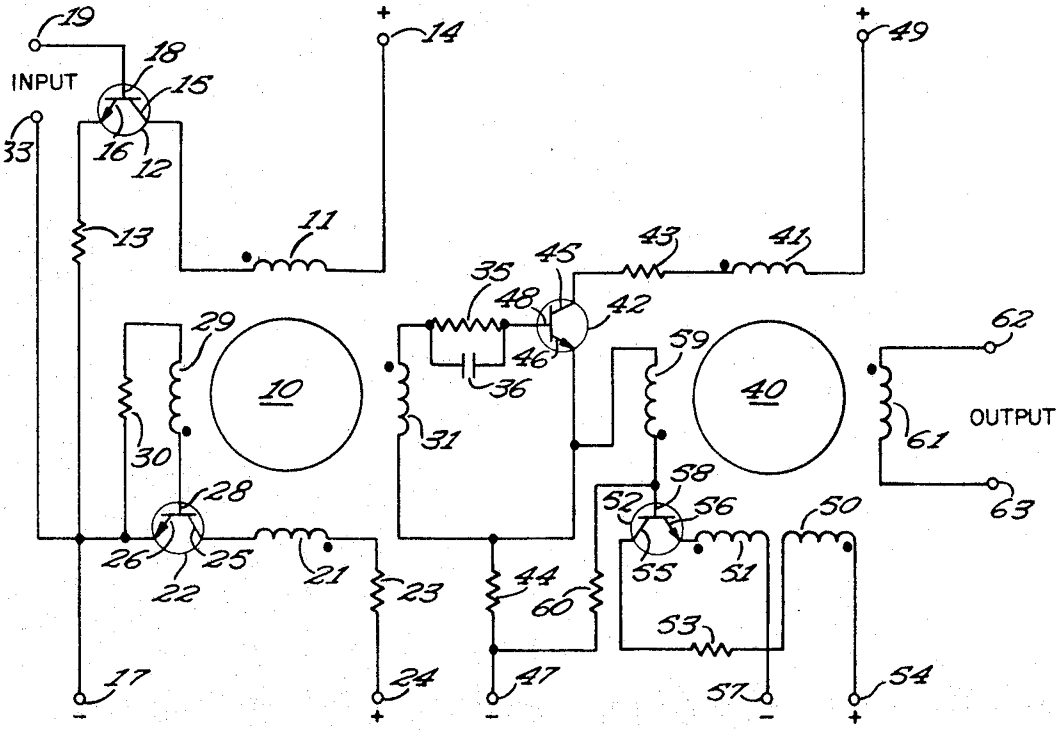
Figure 2:
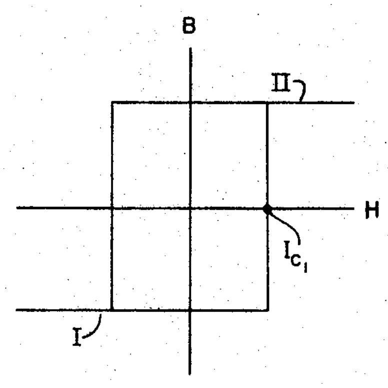
Figure 3:
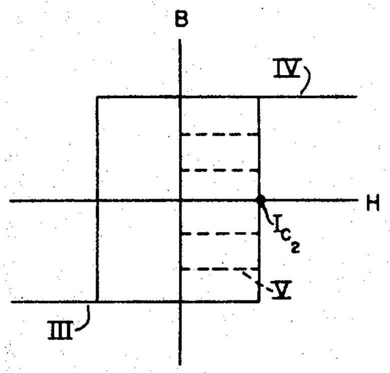

These and other objects of the invention will become apparent upon consideration of the accompanying claims, specification and drawings, of which:

FIGURE 1 is a schematic representation of a counter system using an embodiment of the invention, and FIGURES 2 and 3 are graphical representations of the rectangular hysteresis loops of the cores shown in FIGURE 1.

Referring to FIGURE 1, there is shown a portion of a magnetic counter system. A binary magnetic core 10 has a set channel comprising a set winding 11, a transistor 12 and a resistor 13. Set winding 11 is connected from a positive voltage terminal 14 to a collector 15 of transistor 12. Resistor 13 is connected from a negative voltage terminal 17 to an emitter 16 of transistor 12. A base 18 of transistor 12 is connected to an input terminal 19. A reset channel for core 10 is made up of a reset winding 21, a transistor 22 and a resistor 23. Resistor 23 is connected from a positive voltage terminal

24 to one end of reset winding 21. The other end of reset 21 is connected to a collector 25 of transistor 22. An emitter 26 of transistor 22 is connected to negative voltage terminal 17. A base 28 of transistor 22 is connected to one end of a saturated sensing winding 29. The other end of saturation sensing winding 29 is connected to one end of a resistor 30. The other end of resistor 30 is connected to negative voltage terminal 17. An input terminal 33 is also connected to negative voltage terminal 17. An output winding 31 is associated with core 10. A count or quantizing core 40 has a set channel made up of a set winding 41, a resistor 43, a transistor 42, and a resistor 44. One end of set winding 41 is connected to a positive voltage terminal 49, the other end of set winding 41 is connected to one end of resistor 43. The other end of resistor 43 is connected to a collector 45 of transistor 42. Resistor 44 is connected from a negative voltage terminal 47 to an emitter 46 of transistor 42. Emitter 46 is also connected to one end of output winding 31. A base 48 of transistor 42 is connected to one end of the parallel combination of a resistor 35 and a capacitor 36, and the other end of the parallel combination of resistor 35 and capacitor 36 is connected to the other end of output winding 31. Count core 40 has a reset channel made up of a reset winding 50, a resistor 53, a transistor 52, and a winding 51. Reset winding 50 is connected from a positive voltage terminal 54 to one end of resistor 53. The other end of resistor 53 is connected to a collector 55 of transistor 52. Winding 51 is connected from a negative voltage terminal 57 to an emitter 56 of transistor 52. A saturation sensing winding 59 is connected from a base 58 of transistor 52 to emitter 46 of transistor 42. A resistor 60 is connected from base 58 of transistor 52 to negative voltage terminal 47. An output winding 61 associated with core 40 is connected between an output terminal 62 and an output terminal 63.

Referring now to FIGURES 2 and 3 there are shown approximations of the rectangular hysteresis loops of the binary core in FIGURE 2 and the count or quantizing core in FIGURE 3. The points I and II denote, respectively, the saturated limits of the binary core, as do points III and IV for the count core. The points $I_{c_1}$ and $I_{c_2}$ indicate the coercive currents of the respective cores. Coercive current is herein defined as the average current which must flow through a winding around a core to switch the core from one saturated limit to the other. The point V in FIGURE 3 indicates one of a plurality of stable states achieved in the count process. The functioning of a core with a rectangular hysteresis loop as a volt-second integrator or pulse counter, by stepping from one stable state to another between saturated limits, is well known to those skilled in the art.

The circuit of FIGURE 1 will operate as a counter. That is, for a predetermined number of input signals which appear at input terminals 19 and 33, an output signal will appear at output terminals 62 and 63. To achieve counting the circuit utilizes the inherent property of magnetic core 40 to have a plurality of stable states between and including the saturated limits of the core, and the property of magnetic core 10 to be driven between its saturated limits to provide a count pulse to core 40. One of the limitations of such counters is the susceptability of the hysteresis loop to change with changes in temperature. It is apparent that such a change in the hysteresis loop will have a direct effect on the total count. This adverse effect on total count is overcome in this invention by allowing the changes in core 10 to compensate for the changes in core 40 by the use of an active transfer circuit, here shown as transistor amplifier 42, and by a unique selection of circuit elements. The active transfer circuit, for one thing, eliminates variations in count due to voltage changes in the output signal from core 10, by biasing the amplifier 42 such that its output is dependent only on the pulse width of the output signal from core 10. Assuming that both cores are made of materials which respond similarly to temperature changes, and recognizing that the "count" of core 40 is actually a volt-second integration of the output of core 10, it is apparent that the output of core 10 must be allowed to vary in width as the hysteresis loop of core 40 varies. This means of temperature compensating will be shown more fully in the ensuing discussion.

For operation of FIGURE 1, assume that cores 10 and 40 are in the saturated limit of their respective first stable state, indicated by I in FIGURE 2 and III in FIGURE 3. All transistors are off, and there is no current drawn in the system. Now assume that an input signal appears at input terminals 19 and 33. This input signal will be felt on base 18 to turn on transistor 12. A set current will then flow from positive voltage terminal 14, through set winding 11, from collector 15 to emitter 16, and through resistor 13 to negative voltage terminal 17. The current through set winding 11 will cause core 10 to move from saturated limit I to saturated limit II shown in FIGURE 2. Winding 29 is wound in such a manner that the induced voltage on winding 29 will keep transistor 22 turned off. When the input signal is removed, transistor 12 will turn off and the set current will cease. The collapse of the magnetic field around set winding 11 will reverse the induced voltage on winding 29 to thus turn on transistor 22. A reset current will then flow from positive voltage terminal 24 through resistor 23 and reset winding 21, from collector 25 to emitter 26, thence to negative voltage terminal 17. This reset current through reset winding 21 will induce a voltage on winding 29 of a polarity to keep transistor 22 turned on. When the reset current has driven core 10 back to the saturated limit at point I of FIGURE 2, the impedance of reset winding 21 will drop sharply. This drop in impedance, due to saturation of core 10, will remove the induced voltage on winding 29 and thus turn off transistor 22.

During the time the reset current is flowing, its effect is felt on output winding 31. The resulting output signal is felt on base 48 to turn on amplifier transistor 42. A set current for core 40 will then flow from positive voltage terminal 49, through set winding 41 and resistor 43, from collector 45 to emitter 46, thence the current will take two branches to negative voltage terminal 47, a first branch through resistor 44 and a second branch through winding 59 and resistor 60. Winding 59 is wound such that the induced voltage from set winding 41 on winding 59 will keep transistor 52 off. The set current will flow until core 10 has been reset as described above. When core 10 is reset, the output from winding 31 is removed and transistor 42 will turn off, thus stopping the set current. Core 40 will now be in stable state V shown in FIGURE 3. Each ensuing input pulse to core 10 will cause an input pulse to core 40 which will move core 40 from one stable state to the next, until, during the last of a predetermined number of input pulses to core 40, core 40 reaches the saturated limit at point IV shown in FIGURE 3. At this time, due to saturation of core 40, the impedances of set winding 41 and winding 59 will drop sharply thus causing an increase in current through resistor 60 which will cause transistor 52 to turn on. A reset current will then flow from positive voltage terminal 54 through reset winding 50 and resistor 53, from collector 55 to emitter 56, and through winding 51 to negative voltage terminal 57. However, since the set current is still present the reset current will not yet begin to drive core 40 back to the initial saturated limit. When the last pulse from core 10 is removed transistor 42 will be turned off and the set current will stop flowing. Since transistor 52 is already on, the reset current will take practically immediate effect. The collapse of the magnetic field around set winding 41 will reverse the induced voltage on winding 59 to keep transistor 52 on, until the reset current through reset winding 50 can induce a voltage on winding 59 sufficient to hold on transistor 52. The reset current will flow until the core has reached the saturated limit at point III shown in FIGURE 3. At this point the impedances of reset winding 50 and winding 59 drop sharply, thus removing the on bias from base 58 and turning off transistor 52. Output winding 61 will have sensed the driving of core 40 between its saturated limits and will have provided an output signal to output terminals 62 and 63 which may be attached to various loads, including another count circuit such as core 40 and its surrounding circuitry. The use of both current and voltage sensing in the reset channel of core 40, as described above, removes delay between the end of the last input pulse to core 40 and the beginning of the reset of core 40.

Temperature compensation is achieved in this invention by the selection of a unique set of values which, combined with the net power gain achievable through use of an active transfer circuit, enables the changes in the properties of core 10 to compensate for the changes in the properties of core 40. Assuming both core 10 and core 40 are made of magnetic materials having the same change in coercive current per unit temperature change, hereinafter referred to as Kc, it can be shown that it is desirable to have the output pulse from core 10 vary in width. This is apparent when it is noted that the core 10 performs a volt-second integration of the output of core 10. Thus, if the coercive current of each core increases, the output pulse width from core 10 will increase, the transistor 42 will be on longer, and therefore the set current will flow for a greater period of time through set winding 41.

In first noticing this phenomenon of possible temperature self-compensation between two cores, it was noted that the output pulse width from core 10 is effected by resistor 23 and reset winding 21, and that the set current to core 40 is effected by resistors 43 and 44 and set winding 41. A successful attempt was then made to find a total count temperature compensated configuration dependent only on the above circuit elements, and indepedent of any negative or positive temperature compensation elements. It can be shown that:

$$m=\frac{N_2\phi_2(V_1-R_1I_{c_1})}{N_1\phi_1(V_2-R_2I_{c_2})} \quad (1)$$

where, $m$=desired total count $\phi_1$ and $\phi_2$=flux retentivity of core 10 and core 40, respectively $I_{c_1}$ and $I_{c_2}$=coercive current of core 10 and core 40, respectively $N_1$ and $N_2$=turns in windings 21 and 41, respectively $V_1$ and $V_2$=voltage at terminals 24 and 49, respectively $R_1$ and $R_2$=resistors 23 and 43 plus 44, respectively.

The cores 10 and 40 are chosen such that:

$$\phi_1=A\phi_1 \quad (2)$$

$$I_{c1}=\frac{BN_2I_2}{N_1} \quad (3)$$

where A and B are constants. By substitution of Equations 2 and 3 itno Equation 1 it is shown that:

$$R_2=\frac{V_2-\frac{N_2}{AN_1m}V_1+\left(\frac{N_2}{N_1}\right)^2\frac{BR_1}{Am}I_{c2}}{I_{c2}} \quad (4)$$

Assuming a temperature change of $\Delta T$, then $$\phi'=\phi(1-Kc\Delta T) \quad (5)$$

$$I_c'=I_c(1-K_c\Delta T) \quad (6)$$

where $\phi'$=the respective value of core flux retentivity at the new temperature $I_c'$=the respective value of coercive current at the new temperature.

By substituting Equations 5 and 6 in Equation 5, it is shown that:

$$(7)\qquad R_2'=\frac{R_2-\frac{R_1B}{Am}\left(\frac{N_1}{N_2}\right)^2Kc\Delta T}{1-Kc\Delta T}$$

where $R_2'$=the value of resistors 43 plus 44 necessary to maintain the total count stability at the new temperature.

To have a temperature self-compensating circuit it must be necessary that:

$$(8)\qquad R_2'=R_2$$

which will be true, from Equation 7, if:

$$(9)\qquad \frac{R_2}{R_1}=\left(\frac{B}{A}\right)\left(\frac{N_2}{N_1}\right)^2\left(\frac{1}{m}\right)$$

Equation 9 therefore gives a relationship between the circuit elements and the desired total count, which relationship if observed will achieve total count temperature compensation.

If the cores 10 and 40 are made of the same or similar materials having the same flux retentivity, $\phi$, and the same coercive amp-turns, $NI_c$, it can be shown that Equation 9 becomes:

$$(10)\qquad \frac{R_2}{R_1}=\left(\frac{N_2}{N_1}\right)^2\left(\frac{1}{m}\right)$$

The circuit of FIGURE 1 has been built and proven to work as described above. Total count stability was maintained from −90° F. to +200° F. with a voltage variation of ±20%. The set of values for circuit elements used is shown in Table 1. This is only one of many possible sets of values.

TABLE 1.—Values for circuit of FIGURE 1

| | | |
|---|---|---|
| Windings: | | |
| **11** | turns | 200 |
| **21** | do | 25 |
| **29, 50** | do | 20 |
| **31, 61** | do | 30 |
| **41** | do | 250 |
| **51** | do | 5 |
| **59** | do | 35 |
| Resistors: | | |
| **13** | ohms | 500 |
| **23** | do | 40 |
| **30** | do | 430 |
| **44, 60** | do | 100 |
| **53** | do | 20 |
| **43** | do | 300 |
| **35** | do | 3900 |
| Capacitor **36** | μf | 0.0006 |
| Transistors: | | |
| **12** | | 2N718 |
| **22, 42, 52** | | 2N910 |
| Cores **10, 40** | | 121D500–30 |

I claim as my invention:

1. A counter system comprising:
a source of energy;
at least two saturable magnetic cores capable of multistable operation having a plurality of stable states wherein the first and last of said plurality of stable states are the saturated limits of a substantially rectangular hysteresis loop;
a plurality of windings including set, reset, output and saturation sensing windings wound around each of said cores;
first switching means having first input and output circuits;
means including first impedance means connecting said first output circuit and a first of said reset windings on a first of said cores serially across said source of energy;
means connecting a first saturation sensing winding on said first core to said first input circuit, whereby when said first core reaches the saturated limit of said last stable state, said first saturation sensing winding will bias on said first switching means thus causing a reset current to flow through said first reset winding to drive said first core back to the saturated limit of said first stable state;
amplifying means having second input and output circuits, and operated in a class B manner;
means including second and third impedance means connecting said second output circuit and a second of said set windings on a second of said cores serially across said source of energy;
means connecting a first of said output windings on said first core to said second input circuit, whereby each time said first core is reset a pulse will turn on said amplifying means thus causing a set current to flow through said second set winding, the amount of said set current being independent of the amplitude of said pulse; and
reset means including a second of said reset windings on said second core, whereby when a predetermined number of said pulses have allowed sufficient set current to flow through said second set winding to drive said second core to the saturated limit of said last stable state, said reset means will turn on to drive said second core back to the saturated limit of said first stable state.

2. Apparatus as described in claim 1 characterized by the use of both current sensing and voltage sensing means in said reset means comprising:
second switching means having third input and output circuits;
means connecting said second reset winding and said third output circuit serially across said source of energy;
means connecting a second of said saturation sensing windings on said second core intermediate said third input circuit and said third impedance means;
whereby when said second core reaches the saturated limit of said last stable state, during the last of a predetermined number of said pulses, the resulting increase in current through said third impedance means will be sensed in said third input circuit to turn on said second switching means, thus allowing a current to flow through said second reset winding; and
whereby when said last pulse ends, the regenerative inductive coupling between said second reset winding and said second saturation sensing winding will keep said second switching means turned on until said second core has been reset to said first stable state.

3. A magnetic counter system comprising:
a first source of unidirectional potential;
at least two saturable magnetic cores capable of multistable operation having a plurality of stable states wherein the first and last of said plurality of stable states are the saturated limits of a substantially rectangular hysteresis loop;
a plurality of windings wound around a first of said cores including first set, reset, output and saturation sensing windings;
first semiconductor switching means having first input, output and control electrodes;
means including first impedance means connecting said first input electrode, said first output electrode and said first reset winding serially across said first source of unidirectional potential;
means connecting one end of said first saturation sensing winding to said first control electrode and means connecting the other end of said first saturation sensing winding to one polarity of said first source of unidirectional potential, whereby when said first core reaches the saturated limit of said last stable state, said first saturation sensing winding will bias on said first semiconductor switching means thus causing a reset current to flow through said first reset winding to drive said first core back to the saturated limit of said first stable state;

a second source of unidirectional potential;

a second plurality of windings wound around a second of said cores including second set, reset, output and saturation sensing windings;

semiconductor amplifying means having second input, output and control electrodes, and operated in a class B manner;

means including second and third impedance means connecting said second input electrode, said second output electrode and said second set winding serially across said second source of unidirectional potential;

means connecting said first output winding to said second control electrode, whereby each time said first core is reset a pulse will be felt on said second control electrode to turn on said semiconductor amplifying device to allow a set current to flow through said second set winding, the amount of said set current being dependent on the width of said pulse and independent of the amplitude of said pulse; and reset means including said second reset winding, whereby when a predetermined number of said pulses have allowed sufficient set current to flow through said second set winding to drive said second core to the saturated limit of said last stable state, said reset means will turn on to drive said second core back to the saturated limit of said first stable state.

4. Apparatus as described in claim 3 characterized by the use of both current sensing and voltage sensing means in said reset means comprising:

second semiconductor switching means having third input, output and control electrodes;

means connecting said second reset winding, said third input electrode and said third input electrode serially across said second source of unidirectional potential;

means connecting said second saturation sensing winding intermediate said third impedance means and said third input electrode;

whereby when said second core reaches the saturated limit of said last stable state, during the last of a predetermined number of said pulses, the resulting increase in current through said third impedance means will be felt by said third input electrode to turn on said second semiconductor switching means, thus allowing a current to flow through said second reset winding; and whereby when said last pulse ends, the regenerative inductive coupling between said second reset winding and said second saturation sensing winding will keep said second semiconductor switching means turned on.

5. Apparatus as described in claim 3 characterized by total count temperature stabilization comprising:

said magnetic cores made of magnetic materials all having the same percentage change of coercive current per unit temperature change;

said first core having a flux retentivity, $\phi_1$, equal to a constant, A, times the flux retentivity $\phi_2$, of said second core;

said first core having a coercive current, $I_{c_1}$, equal to a constant, B, times the ratio $N_2I_{c_2}/N_1$, where $N_1$ and $N_2$ are, respectively, the number of turns in said first reset winding and said second set winding, and where $I_{c_2}$ is the coercive current of said second core;

said predetermined number of pulses having a value, $m$; and said first impedance means, $R_1$, and said second impedance means, $R_2$, having values such that:

$$\frac{R_2}{R_1}\left(\frac{B}{A}\right)\left(\frac{N_2}{N_1}\right)^2\left(\frac{1}{m}\right)$$

6. Apparatus as described in claim 3 characterized by total count temperature stabilization comprising:

said magnetic cores made of similar magnetic materials having the same percentage change of coercive current per unit temperature change and the same flux retentivity;

said first reset winding and said second set winding having, respectively, $N_1$ turns and $N_2$ turns;

said predetermined number of pulses having a value, $m$; and said first impedance means, $R_1$, and said second impedance means, $R_2$, having values such that:

$$\frac{R_2}{R_1}=\left(\frac{N_2}{N_1}\right)^2\left(\frac{1}{m}\right)$$

7. A magnetic counter system comprising:

a source of unidirectional potential having first and second polarities;

at least first and second saturable magnetic cores capable of multi-stable operation having a plurality of stable states wherein the first and last of said plurality of stable states are the saturated limits of a substantially rectangular hysteresis loop;

first set, reset, output and saturation sensing windings wound around said first core;

a plurality of impedance means;

first semiconductor switching means having first input, output and control electrodes;

said first set winding connected intermediate said first polarity and said first output electrode, said control electrode connected to a first input terminal, and means including a first of said impedance means connected intermediate said input electrode and said second polarity;

second semiconductor switching means having second input, output and control electrodes;

said first reset winding and a second of said impedance means serially connected intermediate said second output electrode and said first polarity, means connecting said second input electrode to said second polarity, and means including a third of said impedance means connecting said first saturation sensing winding intermediate said second control electrode and said second polarity;

second set, reset, output and saturation sensing windings wound around said second core;

semiconductor amplifying means having third input, output and control electrodes;

said second set winding and a fourth of said impedances serially connected intermediate said third output electrode and said first polarity, means including a fifth of said impedance means connecting said third input electrode to said second polarity, means including a sixth of said impedance means connecting one end of said first output winding to said third control electrode, and means connecting the other end of said first output winding to said third input electrode;

third semiconductor switching means having fourth input, output and control electrodes; and said second reset winding and a seventh of said impedance means serially connected intermediate said fourth output electrode and said first polarity, means connecting said fourth input electrode to said second polarity, said second saturation sensing winding connecting intermediate said third input electrode and said fourth control electrode, and means including an eighth of said impedance means connecting said fourth control electrodes to said second polarity.

8. Apparatus as described in claim 7 characterized by total count temperature stabilization comprising:

said magnetic cores made of magnetic materials all having the same percentage change of coercive current per unit temperature change;

said first core having a coercive current, $I_{c1}$, equal to a constant, A, times the flux retentivity, $\phi_2$, of said second core;

said first core having a coercive current, $I_{c1}$, equal to a constant, B, times the ratio $N_2 I_{c2}/N_1$ where $N_1$ and $N_2$ are, respectively, the number of turns in said first reset winding and said second set winding, and where $I_{c2}$ is the coercive current of said second core;
said second core reaching said saturated limit of said last stable state after a total number of counts having a value, *m*; and
said second impedance means, $R_2$, and said fourth impedance means, $R_4$, having values such that:

$$\frac{R_4}{R_2}=\left(\frac{B}{A}\right)\left(\frac{N_2}{N_1}\right)^2\left(\frac{1}{m}\right)$$

9. Apparatus as described in claim 7 characterized by total count temperature stabilization comprising:
said magnetic cores made of similar magnetic materials having the same percentage change of coercive current per unit temperature change and the same flux retentivity;
said first reset winding and said second set winding having, respectively, $N_1$ turns and $N_2$ turns;
said second core reaching said saturated limit of said last stable state after a total number of counts having a value, *m*; and
said second impedance means, $R_2$, and said fourth impedance means, $R_4$, having values such that:

$$\frac{R_4}{R_2}=\left(\frac{N_2}{N_1}\right)^2\left(\frac{1}{m}\right)$$

10. Apparatus as described in claim 7 wherein:
said first, second and third semiconductor switching means having input, output and control electrodes are transistors having emitter, collector and base electrodes;
said semiconductor amplifying means having input, output and control electrodes in a transistor having emitter, collector and base electrodes; and
said plurality of impedance means is a plurality of resistors.

11. In a counting system comprising: a saturable magnetic count core capable of multi-stable operation having a plurality of stable states wherein the first and last of said plurality of stable states are the saturated limits of a substantially rectangular hysteresis loop, a count channel and a reset channel associated with said count core, a saturable binary core, a set channel and second reset channel associated with said binary core, a transfer circuit between said binary core and said count core; power amplifying means in said transfer circuit whereby an output pulse from said binary core will be amplified by said power amplifying means to be felt in said count channel.

12. In a counting system comprising: a saturable magnetic count core capable of multi-stable operation having a plurality of stable states wherein the first and last of said plurality of stable states are the saturated limits of a substantially rectangular hysteresis loop, a count channel including a count winding associated with said count core, a first reset channel including a control winding and a first reset winding associated with said count core, a saturable binary core, a set channel and second reset channel associated with said binary core, a transfer circuit between said binary core and said count core; current sensing means in said count channel and said first reset channel including said count winding and said control winding, wherein said control winding is inductively coupled to said count winding to normally hold off said first reset channel, and whereby when said count core reaches said last stable state the saturation of said count core will act to drop the impedance of said count winding, thus removing the inducted hold off voltage from said control winding and increasing the current in said current sensing means to turn on said first reset channel, voltage sensing means in said first reset channel including said first reset winding and said control winding, whereby when said reset channel is turned on, the resulting current flow through said first reset winding will cause the inductive reaction of said first reset winding and said control winding to keep said first reset channel on until said count core reaches said first stable states, at which first stable state said count core again saturates.

13. In a temperature compensated counting system comprising: a saturable binary core, a set channel associated with said binary core, a first reset channel, including a first winding having $N_1$ number of turns, and a reset current impedance having a value of $R_1$, associated with said binary core, a saturable magnetic count core capable of multi-stable operation having a plurality of stable states wherein the first and the last of said stable states are the saturated limits of a substantially rectangular hysteresis loop, a count channel, including a second winding having $N_2$ turns and a count current impedance having a value $R_2$ associated with said count core, a second reset channel associated with said count core, transfer circuit between said binary core and said count core, said cores made of similar materials; temperature compensation means comprising said first and second windings and said count and reset current impedance means, wherein the value of said count current impedance means is dependent on the number of turns on said first and second windings, the value of said reset current impedance and the desired number, *m*, of said plurality of stable states of said count core, such that:

$$R_2=\left(\frac{N_2}{N_1}\right)^2\frac{R_1}{m}$$

14. In a counting system comprising: a saturable magnetic count core capable of multi-stable operation having a plurality of stable states wherein the first and last of said plurality of stable states are the saturated limits of a substantially rectangular hysteresis loop, a count channel and a reset channel associated with said count core, a saturable binary core, a set channel and second reset channel associated with said binary core, a transfer circuit between said binary core and said count core; semiconductor amplifying means in said transfer circuit having input, output and control electrodes, means connecting said input and output electrodes in circuit with said count channel and means including a winding on said binary core for inductively connecting said control electrode to said second reset channel, whereby when said binary core is reset a pulse will be felt on said control electrode, which pulse will then be amplified by said semiconductor amplifying device in said count channel.

15. In a counting system comprising: a saturable magnetic count core capable of multi-stable operation having a plurality of stable states wherein the first and last of said plurality of stable states are the saturated limits of a substantially rectangular hysteresis loop, a count channel and a reset channel associated with said count core, a saturable binary core, a set channel and second reset channel associated with said binary core, a transfer circuit between said binary core and said count core; semiconductor amplifying means in said transfer circuit having an input circuit and an output circuit, means connecting said output circuit in circuit with said count channel, and means including a winding on said binary core for inductively connecting said input circuit to said second reset channel, whereby when said binary core is reset a pulse will be felt in said input circuit, which pulse will then be amplified by said semiconductor amplifying device and passed to said output circuit in said count channel.

References Cited

UNITED STATES PATENTS 2,968,796 1/1961 Cane et al. ---------- 340—174

JAMES W. MOFFITT, Primary Examiner

U.S. Cl. X.R.

307—88